United States Patent
Jedema et al.

(10) Patent No.: US 9,410,839 B2
(45) Date of Patent: Aug. 9, 2016

(54) FLOW SENSOR

(71) Applicant: NXP B.V., Eindhoven (NL)

(72) Inventors: Friso Jedema, Eindhoven (NL); Casper van der Avoort, Waalre (NL); Stephan Heil, Eindhoven (NL); Kim Phan Le, Eindhoven (NL); Olaf Wunnicke, Eindhoven (NL)

(73) Assignee: NXP B.V., Eindhoven (NL)

( * ) Notice: Subject to any disclaimer, the term of this patent is extended or adjusted under 35 U.S.C. 154(b) by 50 days.

(21) Appl. No.: 14/300,825

(22) Filed: Jun. 10, 2014

(65) Prior Publication Data
US 2014/0366641 A1 Dec. 18, 2014

(30) Foreign Application Priority Data
Jun. 17, 2013 (EP) .................................... 13172317

(51) Int. Cl.
*G01F 1/56* (2006.01)
*G01F 25/00* (2006.01)

(52) U.S. Cl.
CPC .............. *G01F 25/0007* (2013.01); *G01F 1/56* (2013.01)

(58) Field of Classification Search
None
See application file for complete search history.

(56) References Cited

U.S. PATENT DOCUMENTS

| | | | | |
|---|---|---|---|---|
| 3,528,287 A * | 9/1970 | Melcher | ............... | G01F 1/58 324/439 |
| 4,869,784 A * | 9/1989 | Seymour | ............... | D21C 9/02 162/49 |
| 5,824,914 A * | 10/1998 | Seppa | ............... | G01F 1/60 73/861.11 |
| 6,594,613 B1 * | 7/2003 | Ley | ............... | G01D 3/032 327/553 |
| 7,028,558 B2 | 4/2006 | Stange | | |
| 7,137,307 B2 | 11/2006 | Huybrechts et al. | | |
| 7,950,292 B2 | 5/2011 | Harada et al. | | |
| 8,046,194 B2 * | 10/2011 | Rufer | ............... | G01F 1/584 702/184 |
| 2005/0273014 A1 | 12/2005 | Gianchandani et al. | | |
| 2006/0245467 A1 * | 11/2006 | Casella | ............... | G01D 4/002 374/41 |
| 2009/0188327 A1 * | 7/2009 | Shanahan | ............... | G01F 15/185 73/861.08 |
| 2010/0052080 A1 | 3/2010 | Garcia Tello et al. | | |
| 2011/0256634 A1 | 10/2011 | Jedema | | |
| 2012/0035535 A1 * | 2/2012 | Johnson | ............... | A61M 5/16877 604/67 |
| 2012/0203486 A1 * | 8/2012 | Almalki | ............... | G01C 17/28 702/96 |
| 2013/0053268 A1 * | 2/2013 | Frederix | ............... | C12Q 1/6825 506/9 |

FOREIGN PATENT DOCUMENTS

| | | |
|---|---|---|
| DE | 102 21 677 C1 | 4/2003 |
| DE | 103 08 051 A1 | 9/2004 |
| WO | 02/058551 A2 | 8/2002 |

OTHER PUBLICATIONS

Market Transformation Programme; "BNCK06: Trends in kettle type and usage and possible impact on energy consumption, Version 2.1"; 7 pages (Oct. 4, 2007). Light, Truman S., et al; "The Fundamental Conductivity and Resistivity of Water"; Electrochemical and Solid-State Letters, 8 (1) E16-E19; 8 pages (2005).

(Continued)

*Primary Examiner* — Harshad R Patel (57) ABSTRACT

A method and apparatus for measuring the rate of flow of an ion-containing fluid in a channel are disclosed herein. The apparatus includes a captive sensor operable to detect changes in capacitance value due to the deflection of the ions in the fluid by a magnetic field, and a processor operable to determine a flow speed of fluid from the detected change in capacitance value and a predetermined value of magnetic field strength. Such apparatus may be implemented using CMOS technology. The apparatus may operate in a magnetic field generated by a permanent magnet and measure the flow reliably.

15 Claims, 6 Drawing Sheets

(56) References Cited

OTHER PUBLICATIONS

Fraikin, J. L., et al; "Probing the Debye Layer: Capacitance and Potential of Zero Charge Measured using a Debye-Layer Transistor"; Physical Review Letters, 102, 156601; 4 pages (Apr. 17, 2009).

Widdershoven, F., et al; "CMOS biosensor platform"; 2010 IEEE International Electron Devices Meeting, Dec. 6-8, 2010, San Francisco, CA, USA; pp. 36.1.1-36.1.4 (2010).

Extended European Search Report for application No. 13172317.3 (Nov. 19, 2013).

* cited by examiner

FLOW SENSOR

CROSS-REFERENCE TO RELATED APPLICATIONS

This application claims the priority under 35 U.S.C. §119 of European patent application no. 13172317.3, filed on Jun. 17, 2013, the contents of which are incorporated by reference herein.

The invention relates to a flow sensor for measuring the rate of flow of a fluid.

Fluid flow meters used for example for measuring water flow rate are widely available and work on different physical principles of operation. One class of flow meter is referred to as magnetic flow meters and relies on the principle of the Lorenz Force by applying a magnetic field to a channel carrying a fluid containing ions. A magnetic field which is orthogonal to the direction of flow will displace or separate positive ions (cations) and negative ions (anions) in the fluid. This results in a potential difference across the channel which is proportional to the fluid flow. This potential difference may be detected by sensor electrodes at either side of the channel as a DC measurement. The material forming the channel must be an insulator so that the potential difference can be detected. Electrochemical and other effects at the electrodes may make the potential difference drift and consequently the component of the potential difference due to the fluid flow is difficult to determine. This can be mitigated by using an electromagnet and constantly reversing the magnetic field. However, this can only be done at relatively low frequencies since at higher frequencies the effect of the lorenz force on the ions will be difficult to measure.

Various aspects of the invention are defined in the accompanying claims. In a first aspect there is described a flow sensor for detecting the rate of flow of an ion-containing fluid in a channel, the flow sensor comprising a capacitive sensor and a processor coupled to the capacitive sensor, and wherein the capacitive sensor is operable to detect changes in capacitance value due to the deflection of the ions in the fluid by a magnetic field, and the processor is operable to determine a flow speed of the fluid from the detected change in capacitance value and a predetermined value of magnetic field strength.

The capacitive sensor allows the flow sensor to be positioned on a single plane either within a channel or parallel to the direction of flow. This is because detecting the change in capacitance value does not require the electrodes to be positioned on different planes. The use of capacitive sensing reduces sensitivity to electro migration effects and consequently a permanent magnet rather than an electromagnet may be used to create a magnetic field resulting in a lower cost sensor.

In embodiments of the flow sensor the capacitive sensor comprises a plurality of nano-electrodes. A plurality of nano-electrodes may be used to detect very small changes in capacitance, which may be a few attoFarads, in a fluid flowing across the sensor in the presence of a magnetic field.

In embodiments of the flow sensor the capacitive sensor further comprises a plurality of charge pump circuits and a plurality of integration capacitors and wherein each of the plurality of charge pump circuits is coupled to a respective one of the plurality of nano-electrodes and a respective one of the plurality of integration capacitors.

In embodiments the flow sensor includes a temperature sensor coupled to the processor. This allows the flow sensor to compensate dynamically for any effect of temperature on the measured capacitance value for a given flow rate.

In embodiments the flow sensor includes a magnetic field sensor coupled to the processor, This allows the flow sensor to compensate dynamically for any variation in magnetic field strength on the measured capacitance value for a given flow rate.

In embodiments of the flow sensor the processor is further operable to calculate the volume of fluid flowing in a channel of a predetermined cross-sectional area past the capacitive sensor.

If the flow sensor is placed in a fluid channel where the cross sectional area is known. The processor can determine the volume of fluid flowing past the sensor by integrating the determined fluid flow speed multiplied by the cross sectional area over time.

In embodiments the flow sensor may include a touch sensor coupled to the processor and the flow sensor is operable to change from a standby mode of operation to a normal mode of operation in response to the touch sensor being touched by a user. This may reduce the power consumption requirements when flow sensing is not required.

In embodiments, the flow sensor may include a near field communication (NFC) receiver coupled to the processor. The NFC receiver may be used to receive data regarding a predetermined volume or flow rate, or maybe used to update default values of flow rate or magnetic field strength transmitted from an NFC transmitter. The NFC receiver may also be used to actuate a valve for example on a tap, as well as initiate the calibration or first measurement of the flow sensor.

Embodiments of the flow sensor of may include a radio frequency transponder coupled to the processor. The RF transponder or transceiver allows the flow-sensor to communicate wirelessly to remote control and/or monitoring devices. The remote control and/or monitoring devices maybe on a dedicated wireless network or may be connected via the internet. Embodiments of the flow sensor including the RF transponder may communicate according to the Zigbee standard or other protocol used in building control systems.

Embodiments of the flow sensor may be implemented as an integrated circuit allowing a robust flow sensor to be produced at low cost.

Embodiments of the flow sensor may form part of a flow measurement apparatus including a magnet arranged such that in operation the magnetic field displaces one of the positive ions and the negative ions in the fluid towards the capacitive sensor.

For maximum sensitivity a magnet for providing a magnetic field can be arranged so that the magnetic field is orthogonal to the direction of flow of the fluid to be measured. However, provided the magnetic field deflects either anions or cations in a general direction towards the flow sensor, a change in capacitance may be detectable.

The magnet may be an electromagnet or permanent magnet for example $Nd_2Fe_{14}B$ or other ferromagnetic material.

Embodiments of the flow sensor may include a pH sensor coupled to the processor.

Embodiments of the flow sensor together with a magnet may be incorporated into a water tap which may also be referred to as a spigot or faucet.

A dispensed water volume may be determined and displayed by the flow sensor so that the user of the tap can dispense a known volume of water into a container. This may reduce energy waste for example when filling an electric kettle usually results in too much water as the fill level is hard to see while tapping. In cooking recipes one needs to quantify a certain volume of water which is usually done via a graduated beaker. A tap including a flow sensor with a display showing the amount of water dispensed removes the requirement to have a graduated measuring beaker.

Embodiments of the flow sensor including a near field communication receiver may be included in a tap. The container may include a tag containing the volume of that container which can be communicated to the flow sensor. The tap may generate an alert when the required amount of water has been dispensed.

Embodiments of a tap with a flow sensor including a touch sensor, or a NFC receiver may be coupled to an actuator for controlling a valve. The tap is operable to open and/or close the valve in response to the touch sensor being touched or a container with a NFC transmitter being placed in proximity to the tap.

In a second aspect there is described a method for measuring the flow rate of an ion-containing fluid, the method comprising: detecting a capacitance value due to the deflection of the ions in the fluid by a magnetic field, and determining a flow speed of the fluid from the detected capacitance value.

Embodiments of the invention are now described in detail, by way of example only, illustrated by the accompanying drawings in which.

DESCRIPTION

Figure 1:
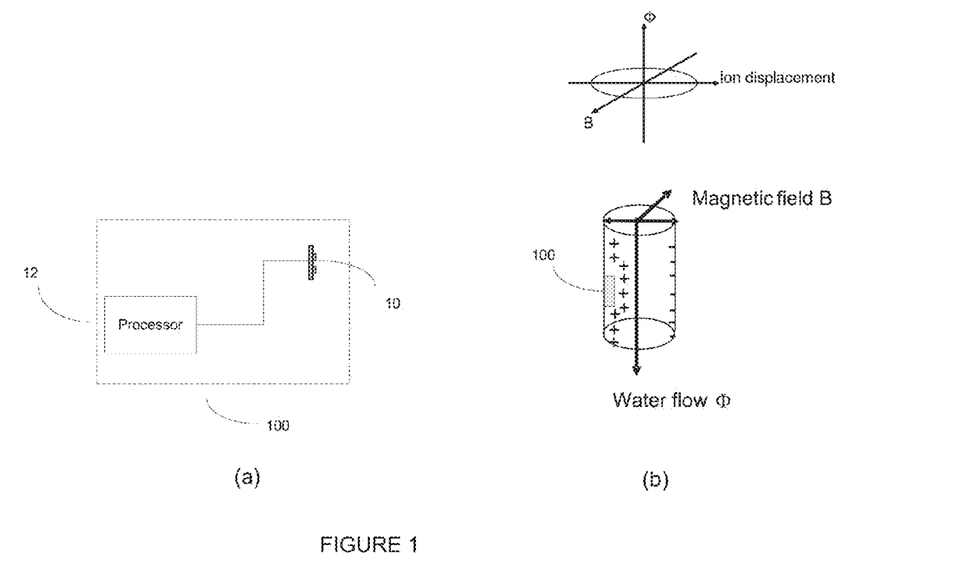
FIG. 1 shows a flow sensor according to an embodiment.

FIG. 1a shows flow sensor 100 which includes a capacitive sensor 10 which may be coupled to a processor 12. The capacitive sensor 10 may include multiple small capacitor electrodes which may be nano-electrodes. In operation capacitive sensor 10 may be positioned to sense the flow of a fluid containing ions in a channel as illustrated in FIG. 1b. This fluid may for example be water but can be any other fluid which contains ions. In operation, for example to detect water flow speed Φ, a magnetic field B may be applied orthogonally to the direction of water flowing in the channel at the point where the capacitive sensor is positioned. The magnetic field will physically separate positive ions, for example $H_3O^+$, and negative ions, for example $OH^-$, in the flowing water due to the Lorenz force. This separation may be detected by the capacitive sensor 10. The measured capacitance is proportional to the flow speed of the water in the tube, the measured capacitance change is a function of the drift velocity of the water in the tube. The processor 12 may convert the detected capacitance value into a value representative of the flow speed of the water.

To reduce the possible effect of lime scale on the sensor where the fluid to be measured is water, the flow sensor may be placed on the portion of the channel surface where cations are being displaced away from the sensor.

In embodiments the processor may be an analogue to digital converter combined with a logic circuit to generate a digital value representative of the flow rate. In embodiments the processor may be a microprocessor or microcontroller. Embodiments of the capacitive sensor may include a number of nano-electrodes formed on a single semiconductor substrate. The processor 12 and the capacitive sensor 10 may be implemented as a single integrated circuit.

Figure 2:
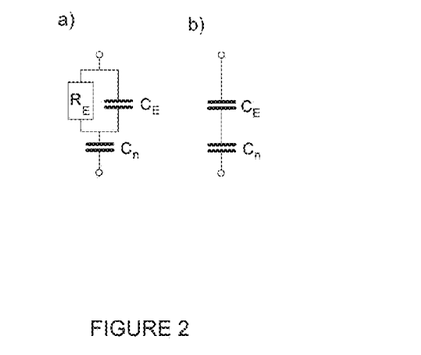
FIG. 2 illustrates an equivalent circuit showing the principle of operation of the flow sensor.

FIG. 2 illustrates the principle of operation of an example capacitive sensor. The measured electrode capacitance C is determined by the admittance path from the capacitive sensor to a ground potential at sample frequencies of around 50 MHz. The admittance measured by the sensor can be modelled as a fluid impedance $Z_E$ consisting of a fluid resistance $R_E$ arranged in parallel with a fluid capacitance $C_E$. The fluid resistance $R_E$ and fluid capacitance $C_E$ are in series with an electrode capacitance $C_n$. The electrode capacitance $C_n$ may be a nano-electrode. At frequencies greater than 300 MHz the equivalent circuit may be modelled as fluid capacitance $C_E$ in series with an electrode capacitance $C_n$.

$C_n$ is the Debye capacitance at the surface of an electrode, $R_E$ is the water resistance and $C_E$ is the water capacitance. Are all determined by the geometrical size of the electrode, as can be seen by the expressions given below:

$$C_n = c_0 \pi \left(\frac{d}{2}\right)^2 \quad \text{Equation 1}$$

$$R_E = \frac{1}{2d\sigma_E} \quad \text{Equation 2}$$

$$C_E = 2d\varepsilon_0 \varepsilon_E. \quad \text{Equation 3}$$

Here d is the diameter of the electrode (capacitor), $c_0$ is the Debye capacitance (due to the presence of ions), $\sigma_E$ is dc conductivity of the water, $\epsilon_o$ is the permittivity of vacuum ($8.854 \times 10^{-12}$ C/V-m) and $\epsilon_E$ is the relative permittivity of the water solution. The impedances of equation 1, equation 2 and equation 3 can be considered as the fundamental impedances relevant for the flow sensor. These three impedances may be influenced by the presence of the external magnetic field in combination with the flow of water. The displacement of ions in the water, due to the Lorenz force acting upon them will alter $c_0$, $\sigma_E$ and $\epsilon_E$. Hence the displacement will become dependent on the magnetic field B and the flow rate Φ). Therefore the flow rate can be determined by measuring a change in the capacitance of the electrode.

If the orientation of the magnetic field is such that negative ions are deflected towards the electrode, the capacitance will increase with increasing flow rate. If the orientation of the magnetic field is such that positive ions are deflected towards the electrode, the capacitance will decrease with increasing flow rate. For nano-electrodes which may be less than 100 nm in diameter for an electrode with circular cross section or less than 100 nm in width, the detected change an individual electrode can be very small, for example in the atto-Farad range ($10^{-18}$ Farads). The capacitive sensor 10 may be formed from arrays of hundreds of individual nano-electrodes allowing statistical algorithms and frequency signal modulation to be used to provide a robust signal despite various possible low frequency parasitic influences.

Where the flow sensor is located to detect the flow in a channel of known cross-sectional area, the fluid volume may be determined from the measured flow rate integrated over flow time duration and cross-sectional area.

Figure 3:
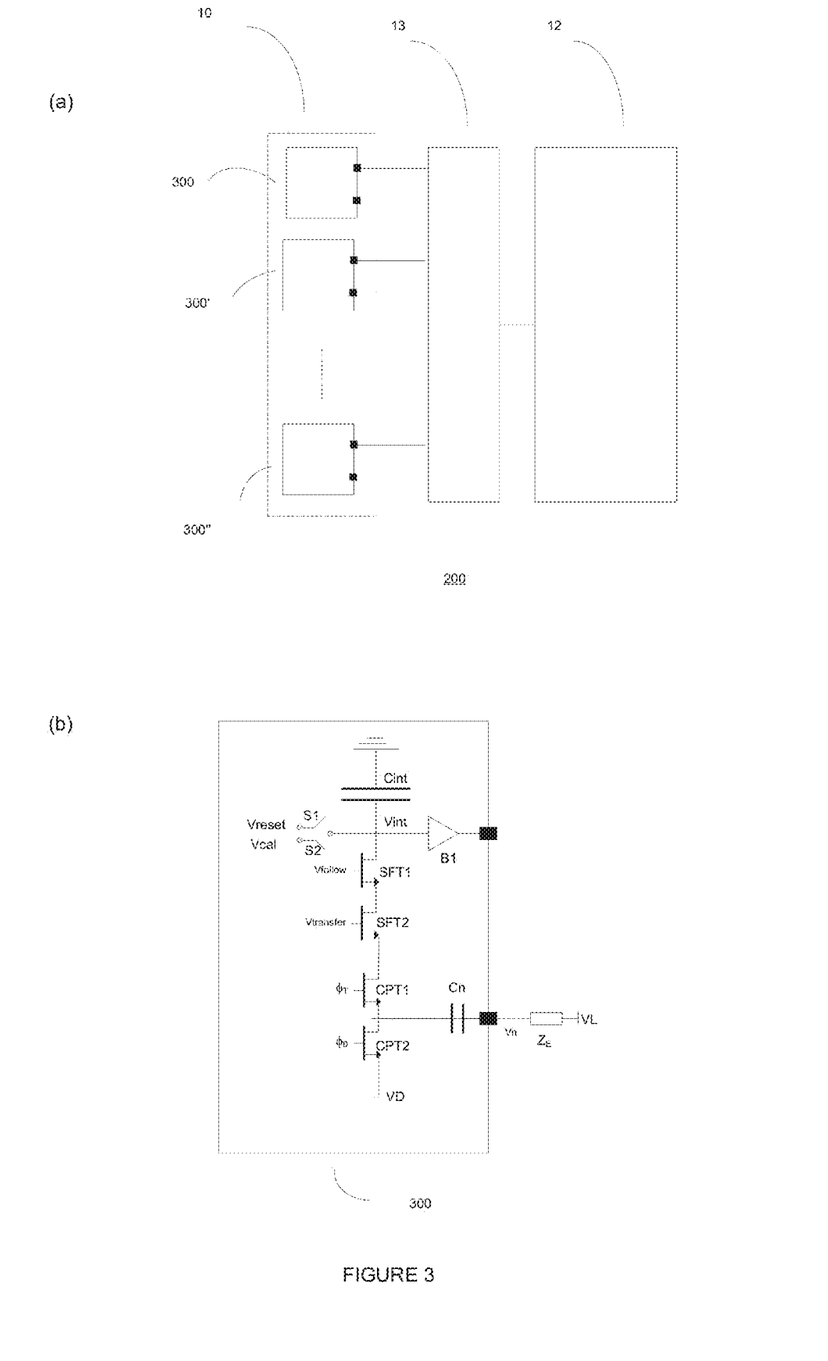
FIG. 3 shows an example flow sensor circuit according to an embodiment.

FIG. 3(a) illustrates a flow sensor 200. The capacitive sensor has a plurality of nano-electrode sensors 300. The output of each of the nano-electrode sensors 300 may be connected to an analog to digital convertor 13 which may include multiplexing circuitry to select a subset of the plurality of sensors 300. The output of the analog to digital converter 13 may be connected to a processor 12. Alternatively the analog to digital converter may be included in the processor. FIG. 3(b) shows an example circuit for a nano-electrode sensor 300. A nano-electrode is shown as a capacitor having a Debye capacitance $C_n$. A charge pump circuit may be formed by a series arrangement of a first charge pump transistor CPT1, and a second charge pump transistor CPT2. The nano-electrode may be connected to a source of first charge pump transistor CPT1 and the drain of second charge pump transistor CPT2. The source of second charge pump transistor CPT2 may be connected to a supply rail VD. A source follower circuit may be formed by a series arrangement of a first source follower transistor SFT1 and a second source follower transistor SFT2. The drain of first charge pump transistor CPT1 may be connected to the source of the second source follower transistor SFT2. The drain of the second source follower transistor SFT2 may be connected to the source of the first source follow transistor SFT1. The drain of the first source follower transistor SFT1 may be connected to a first electrode of integration capacitor Cint. A second electrode of capacitor Cint may be connected to a ground rail. The first electrode of capacitor Cint may be connected to a first voltage rail Vreset via a switch S1 which may be implemented using a transistor. The first electrode of capacitor Cint may be connected to a second voltage rail Vcall via a switch S2 which may be implemented using a transistor. The first electrode of capacitor Cint may be connected to the input of an analog to digital convertor. The arrangement of integration capacitance Cint, first source follower transistor SFT1 and second source follower transistor SFT2 may form an analog charge detector. In embodiments $C_{int}$ may have a capacitance of 480 fF. In embodiments $C_{int}$ may have a range of 100 fF to 5 pF. Transistors CPT1, CPT2, SFT1 and SFT2 may be NMOS transistors.

The first electrode of integration capacitor $C_{int}$ may be connected to a voltage buffer B1. The output of the voltage buffer may be connected to an analog to digital converter.

In operation the capacitive sensor is placed adjacent to a channel containing a fluid such as water which contains ions. The nano-electrode may not be in direct contact with the fluid but may be separated by an isolation layer between 1 nm to 1000 nm in thickness. The equivalent impedance may be due to $C_n$ and a fluidic impedance $Z_E$ as described in FIG. 2.

At the start of a measurement the integration capacitor $C_{int}$ may be charged to voltage $V_{reset}$ which may be a voltage of 1.2 volts by closing the reset switch 51. Subsequently the integration capacitor $C_{int}$ may be discharged by the charge pump by sequentially opening and closing transistor CPT1 and opening and closing transistor CPT2. For each cycle a quantity of charge is transferred, which may be three orders of magnitude lower than the total charge residing on the initialized integration capacitor $C_{int}$. The exact quantity of charge transferred may depend on the capacitance of the nano-electrode $C_n$, the connected fluidic impedance $Z_E$ and on chip impedance. A change in $C_n$ and/or $Z_E$ can be induced by the deflection of ions towards or away from the nano-electrode $C_n$, thereby changing the amount of charge transferred for each charge pump cycle. The fluid potential $V_L$ may be set by a reference electrode in contact with the fluid. Alternatively one or more of the nano-electrodes of the inactive nano-electrode sensors 300 may act as the reference electrode. By setting the fluid potential $V_L$ using the inactive nano-electrodes the capacitive sensor 10 can be placed on one side of the channel providing a simple and robust solution for fluid flow measurement.

The total amount of charge $Q_{INT}$ that is pumped away from the integration capacitor $C_{int}$ in a number of pump cycles $N_i$ may be determined by measuring the final voltage $V_{INT}$ across the integration capacitor by the Analog to Digital Converter 13 (ADC).

The number of pump cycles $N_i$ may be chosen such that the integration capacitor $C_{int}$ is discharged as far as possible. This may be for example until the remaining voltage $V_{INT}$ of the integration node is just high enough to keep the voltage buffer alive which may be a voltage of 0.6 Volts. As an example with a discharge voltage VD=0.1 V and a charge pump modulation amplitude of 0.2 V, the maximum voltage at the source of the lower cascode source follower transistor SFT2 is VT=0.3V. The gate of source follower transistor SFT1 may be biased to a voltage Vfollow. The gate of source follower transistor SFT2 may be biased to a voltage Vtransfer. The two cascode source follower transistors may require a potential difference of 0.2V between the drain of SFT1 having a voltage of $V_{cascode}$ and the source of SFT2 having a voltage of $V_T$ in total. Added to the 0.3V at the maximum of the modulation voltage this is 0.5V. The supply voltage may be 1.2V. So this leaves a theoretical 0.7V available for the voltage swing over the integration capacitor. Subtracting a safety margin of 0.1V to accommodate for the required voltage needed by the buffer, the maximum applicable voltage swing over the integration capacitor may be 0.6 V. For a value of the integration capacitor $C_{int}$ of 480 fF, the maximum charge $Q_{INT}$ that can be pumped away from the integration capacitor is approximately 0.6 Volt×480 fF=0.288 pC.

The nano-electrode Cn may be coated with a layer such as Teflon, conductive or insulation polymers and/or an inorganic layer such as SiO2, Si3N4, TiOx, TaOx. For applications where water flow is to be detected coating the nano-electrode may reduce the effect of scaling on the sensor. The nano-electrode may be gold or copper. The skilled person will appreciate that the capacitive sensor of FIG. 2 may be implemented using a CMOS process.

Figure 4:
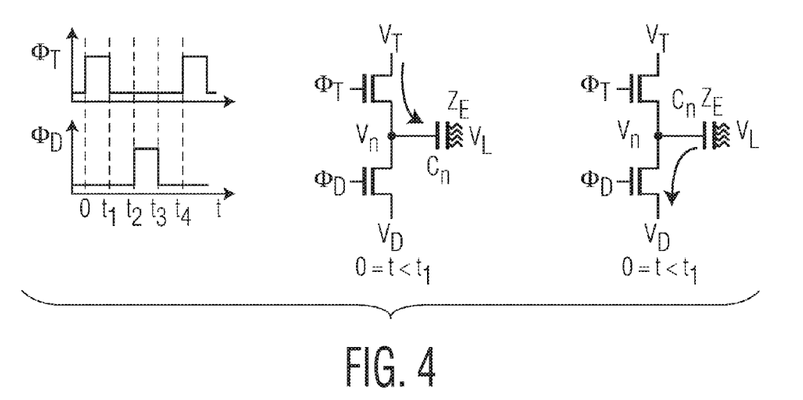
FIG. 4 illustrates the principle of operation of the flow sensor circuit of FIG. 3.

FIG. 4 shows the basic operation principle of the charge pump of the nano-electrode sensor circuit 300. Firstly the discharge switch formed by second transistor CPT2 which may be an NMOS transistor is closed that is CPT2 is switched on. This may discharge the nano-electrode capacitor Cn to the supply rail $V_D$ which may be set to a ground potential. At a time t=0 the gate voltage $\phi_T$ of transistor CPT1 which may be an NMOS transistor is at a voltage such that the transistor CPT1 switches on, thereby enabling the nano electrode capacitor Cn to be charged to a voltage $V_T$. At this time t=0 transistor CPT2 is switched off. At a time t=t1 the gate voltage $\phi_T$ of transistor CPT1 is at a voltage such that transistor CPT1 is switched off. This may electrically isolate the drain of CPT1 from the nano electrode capacitor Cn. At t=t2 the gate voltage $\phi_D$ of transistor CPT2 transistor is pulled high to switch on CPT2 in order to discharge the nano-electrode capacitor Cn to the discharge voltage $V_D$ again. At time t=t3 both CPT1 and CPT2 are switched off. At time t=t4 CPT1 is switched on and the charge transfer cycle repeats.

The charge $Q_{cycle}$ transferred though the charge pump after one cycle is:

$$Q_{cycle}=(V_T-V_D)C \qquad \text{Equation 4}$$

Where C is the effective capacitance due to the nano electrode capacitance Cn and the fluid impedance $Z_E$ nano electrode capacitance and $V_T-V_D$ is the charge pump modulation amplitude. After $N_i$ discharge/transfer cycles the total amount of charge transferred from the integration capacitor is:

$$Qn_{cycle}=N_i(V_T-V_D)C \qquad \text{Equation 5}$$

When a change occurs in the effective capacitance C by an amount $\Delta C$, a corresponding change $\Delta QINT$ in the transferred charge from the integration capacitor will follow. Hence a change in capacitance caused by a change in flow speed of a fluid containing ions in the presence of a magnetic field can be detected, since a change in flow speed will alter the amount of deflection or displacement of the ions and therefore the resulting effective capacitance.

The source follower transistors SFT1 and SFT2 between the integration capacitor $C_{int}$ and the charge pump maintain a substantially constant voltage at the input of the charge pump, despite the continuously declining voltage $V_{INT}$ due to the discharging of the integration capacitor. Both cascode source follower transistors may work in deep sub-threshold. By biasing in deep sub threshold, the drain currents may be about 6 nanoamps. In embodiments the threshold voltage may be 0.3 volts. The drain current of SFT1 and SFT2 in deep sub threshold operation may be a few nanoamps whereas if the gate source voltage difference of SFT1 and SFT2 is greater than the threshold voltage, the drain current may be several microamps. The gate source voltage of SFT1 and SFT2 may be less than 70 millivolts in deep sub-threshold operation.

In a deep sub-threshold bias regime the transistors CPT1 and CPT2 may need only a drain-source voltage of about 0.1V to operate. So the two source follower transistors cascode may only need about 0.2 V in total.

The voltage buffer between the analog to digital converter and the integration capacitor $C_{int}$ may prevent the influence of the state of charge of the integration capacitor, as represented by $V_{INT}$. However the voltage buffer may induce a potential drop $V_X$ of several tens of Volts between the analog to digital converter and the integration capacitor voltage $V_{INT}$. As $V_X$ may change over time, a read out by the analog to digital converter may be followed by a calibration measurement. The analog to digital convertor may be a 10 bit convertor. A measurement performed by the A/D converter consists of a measurement of $V_{INT}$ which may be followed by a calibration measurement. The calibration measurement may be performed by closing the calibration switch S2 thereby connecting a calibration voltage Vcal to the input of the A/D converter. This procedure may eliminate possible drifts and 1/f noise in the A/D converter and may be used to subtract the potential drop and 1/f noise of the source follower from the measurement. The sequence of both measurements first yields:

$$V_{ADC1}=V_{int}-V_x \qquad \text{Equation 6}$$

where $V_X$ represents the unknown voltage drop across the single source follower. The second calibration measurement yields information on $V_X$:

$$V_{ADC2}=V_{cal}-V_x \qquad \text{Equation 7}$$

From equations 6 and 7 the value of the integration capacitance voltage Vint can be determined and hence the charge $Q_{INT}$ that has been pumped away from integration capacitor $C_{int}$ can be calculated as:

$$Q_{INT}=(V_{reset}-V_{adc1}+V_{adc2}-V_{cal})*C_{int} \qquad \text{Equation 8}$$

A processor coupled to the digital output of the analog to digital convertor can therefore calculate the charge $Q_{INT}$ using the above measurement steps and given a known value for $V_{reset}$, $V_{cal}$ and $C_{int}$. This may be used to determine the effective capacitance C due to the nano-electrode capacitance $C_n$ and the fluid capacitance $C_e$ by combining equations 5 and 8

$$C=(V_{reset}-V_{adc1}+V_{adc2}-V_{cal})*C_{int}/(N*(V_T-V_D)) \qquad \text{Equation 9}$$

Embodiments of the capacitive sensor may have many nano electrodes and associated charge pump circuits and integration capacitors. Embodiments may have more than one analog to digital convertor. A capacitive sensor may have an array of 256×256 nano electrodes arranged in a rows 256 coupled to 8 analog to digital convertors. A single analog to digital convertor may read 32 columns in approximately 40 microseconds. A read out of a value for Qint for 256 nano-electrodes may take 140 microseconds. Reading the entire array may take 40 mS consequently each nano electrode may be samples at a rate of 25 samples per second.

An example of flow sensor calibration is now described assuming water is the fluid. This could be done for example just before the water starts to flow for example when a person touches the opening valves. The following illustrates the relationship between the volumetric flow rate and the detected change in measured capacitance.

1. An initial capacitance measurement may be made for B=0 (no magnetic field) and $\Phi$=0 (no water flow). For a single nanoelectrode this may give a measured capacitance of 100 aF. With an electrode radius of 65 nm, this amounts to a debye layer capacitance density of approximately $8 \times 10^{-3}$ Farad/m2.
2. In J.-L. Fraikin at al, "Probing the Debye Layer: Capacitance and Potential of Zero Charge Measured using a Debye-Layer Transistor", published in Physical review letters, 17 Apr. 2009, a change in the Debye layer capacitance is obtained of $\Delta C_{DL}=4 \times 10^{-5}$ F/m$^2$/mV, where the voltage refers to a dc voltage difference between the nano-electrode and the fluid (parameter $V_L$).
3. Next the Hall voltage has to be calculated when water is flowing: suppose a maximum flow rate $\Phi$=100 ml/sec, a maximum magnetic field of B=1 Tesla and a square tube with a cross-section A=w×h=1 cm×1 cm=1×10$^{-4}$ m$^2$. Then the maximum flow velocity $v_{d,max}=\Phi/A$=1 m/s. The maximum Hall voltage $V_{H,max}=v_{d,max} \times B \times h$=1×1×10$^{-2}$=10 MV.
4. From 2 and 3 follows the maximum induced Debye layer change: $\Delta C_{DL,max}=4 \times 10^{-4}$ F/m$^2$. This corresponds to 5% ($4 \times 10^{-4}/8 \times 10^{-3} \times 100\%$) of the initial signal under 1).
5. From 4) and 1) the maximum signal is about 20% of 100 aF, which is 5 aF. With a noise of ~1 aF for a single nano-electrode and 10$^{-2}$ aF for a 256×256 array of nano-electrodes, the change in value may be detected.

Figure 5:
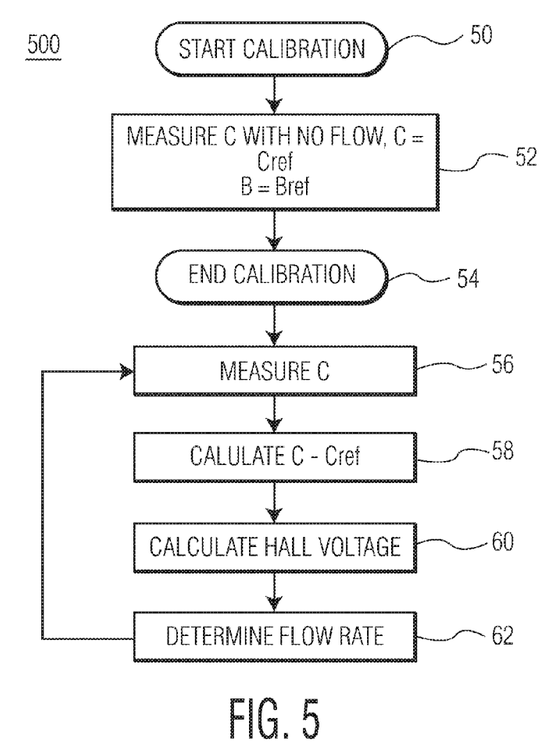
FIG. 5 shows a method of operation of a flow sensor according to an embodiment.

Hence it will be appreciated by the skilled person that the flow rate may be determined from the capacitance change relative to the value when no fluid is flowing in a magnetic field of known value. This is illustrated in FIG. 5 where an initial calibration phase starts at step 50. A measurement of capacitance is taken by the flow sensor placed in the channel with fluid present but not flowing in step 52. The magnetic field strength B is a known reference value Bref which may be predetermined. The calibration phase ends at step 52. The calibration phase may be repeated each time the flow sensor is powered up or it may be done once when the flow sensor is initially installed. Once the capacitance value with no flow is known, the flow may be determined firstly by measuring the capacitance value C in step 56 and then calculating the difference between the measured capacitance C and the reference capacitance Cref at zero flow in step 58. The difference between C and Cref can be used to derive the Hall voltage in step 60. Once the Hall voltage has been calculated the velocity and therefore the flow rate is determined in step 62. This method may then return to step 56 and the cycle repeats.

Figure 6:
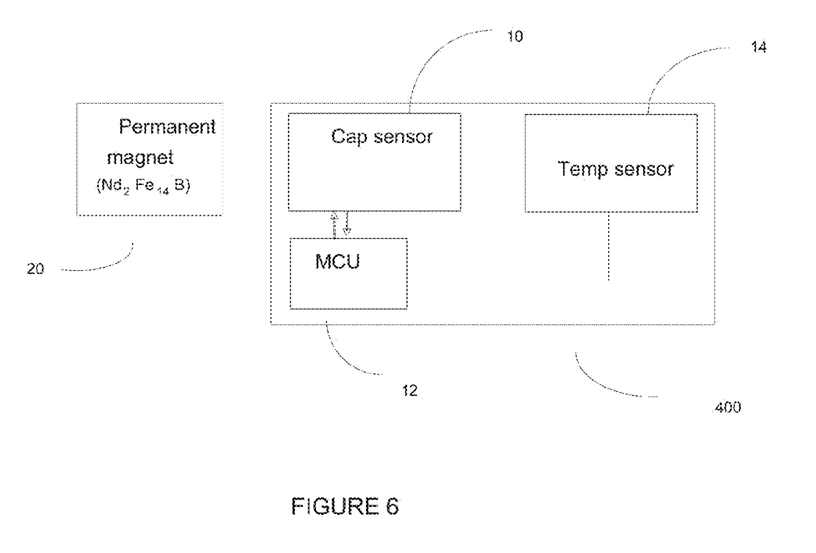
FIG. 6 shows a flow sensor including a temperature sensor according to an embodiment.

FIG. 6 shows flow sensor 400 including a capacitive sensor 10 which may be coupled to a processor 12. The capacitive sensor 10 may include multiple small capacitor electrodes which may be nano-electrodes and formed using CMOS technology. In operation capacitive sensor 10 may be positioned to sense the flow of a fluid containing ions in a channel. This fluid may for example be water but can be any other fluid which contains ions. In operation, for example to detect water flow speed, a magnetic field may be applied orthogonally to the direction of water flowing in the channel at the point where the capacitive sensor is positioned. Positive ions, for example $H_3O^+$, and negative ions, for example $OH^-$, in the fluid may be separated due to the magnetic field. This separation may be detected by the capacitive sensor 10. Since the measured capacitance may be proportional to the flow speed of the water in the tube, the processor 12 may convert the detected capacitance value into a value representative of the flow speed of the water. Temperature sensor 14 may be connected to processor 12. Processor 12 may determine the flow speed by firstly determining a capacitance value corresponding to the stationary fluid when a magnetic field is applied which may use a permanent magnet 20. This may for example be a user initiated calibration sequence when the user knows that the sensor is in position and the fluid is stationary in a channel. This capacitance value may correspond to the situation of maximum displacement or separation of the ions in the fluid due to the Lorenz force resulting from the magnetic field. This initial calibration may only need to be done once but may also be repeated. Once the fluid is flowing, the separation of the ions by the magnetic field will on average decrease as the rate of flow increases and consequently the capacitance will change. The difference between the capacitance measured and the reference capacitance value when there is no flow may give an indication of flow speed. The processor may also use the temperature of the fluid measured by the temperature sensor to compensate the measured capacitance value for temperature.

Figure 7:
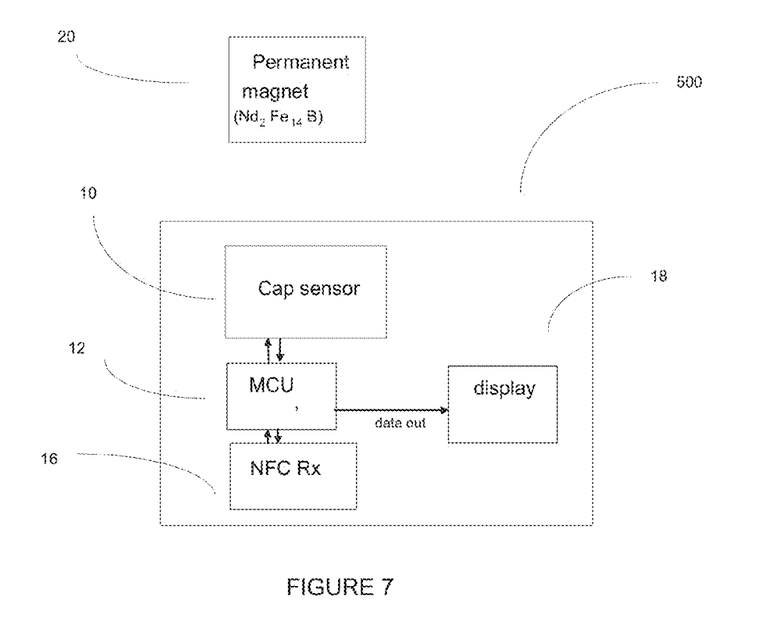
FIG. 7 shows a flow sensor including an NFC receiver and a display according to an embodiment.

FIG. 7 shows flow sensor 500 including a capacitive sensor 10 which may be coupled to a processor 12. The capacitive sensor 10 may include multiple small capacitor electrodes which may be nano-electrodes and formed using CMOS technology. Near Field Communication (NEC) Receiver 16 may be connected to processor 12. Display 18 may be connected to processor 12. In embodiments the display 18 may use LED, LCD or other known display technologies. Processor 12 may determine the flow speed by firstly determining a capacitance value corresponding to the stationary fluid when a magnetic field is applied which may use a permanent magnet 20. Alternatively or in addition, an electromagnet may be used to provide a magnetic field. If an electromagnet is used, the magnetic field may be periodically reversed or the field strength changed. This may reduce sensitivity to parasitic DC drifts.

In operation of flow sensor 500 capacitive sensor 10 may be positioned to sense the flow of a fluid containing ions in a channel which may have a predetermined cross-sectional area. This fluid may for example be water but can be any other fluid which contains ions. In operation, for example to detect water flow speed, a magnetic field may be applied orthogonally to the direction of water flowing in the channel at the point where the capacitive sensor is positioned. The magnetic field will physically separate positive ions, for example $H_3O^+$, and negative ions, for example $OH^-$, in the flowing water due to the Lorenz force. This separation may be detected by the capacitive sensor 10. Since the measured capacitance may be proportional to the flow speed of the water in the tube, the processor 12 may convert the detected capacitance value into a value representative of the flow speed of the water. In operation the NFC receiver may receive a signal from an NFC transmitter to provide power to the flow sensor 500. The NFC receiver may receive a signal from an NFC transmitter indicating a predetermined volume of fluid. In embodiments, the NFC receiver 36 may include a secure element. The processor 12 may calculate the volume of fluid which has passed the flow sensor after a period of time following a start condition which may involve for example applying a reset signal to the processor from the flow rate, cross sectional area and the flow time duration. The processor 12 may display the volume on the display 18. The processor 12 may indicate when a predetermined volume has been reached on the display 18.

Figure 8:
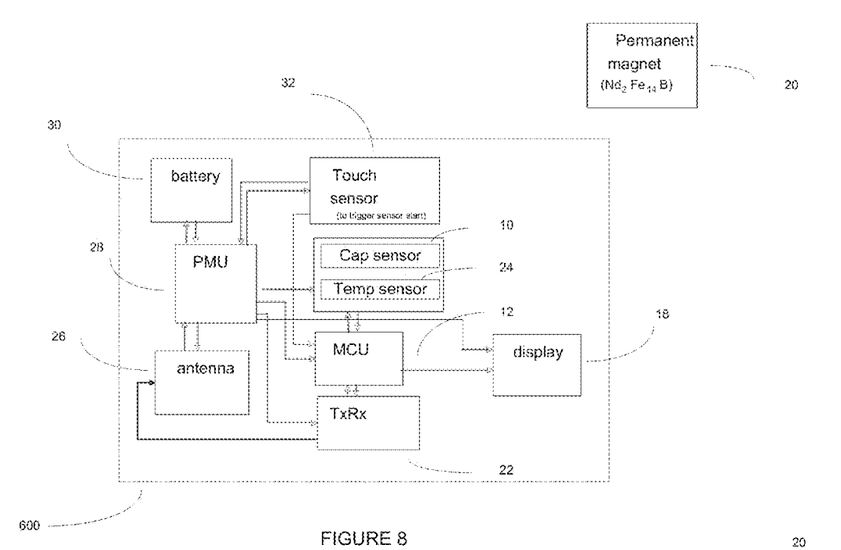
FIG. 8 shows a flow sensor including a wireless transceiver according to a further embodiment.

FIG. 8 shows flow sensor 600 including a capacitive sensor 10 which may be coupled to a processor 12. The capacitive sensor 10 may include multiple small capacitor electrodes which may be nano-electrodes and formed using CMOS technology. Touch sensor 32 may be connected to a power management unit 28. A battery 30 may be connected to the power management unit 28. A power management unit 28 may be connected to a capacitive sensor 10, a temperature sensor 24, a processor 12 and a transponder 22 which may be configured to transmit/or receive signals according to the Zigbee standard. The transponder 22 may be connected to antenna 26. The transponder 22 may be connected to processor 12. Temperature sensor 24 may be connected to processor 12. The processor 12 may be connected to the display 18.

In operation of flow sensor 600 capacitive sensor 10 may be positioned to sense the flow of a fluid containing ions in a channel which may have a predetermined cross-sectional area. This fluid may for example be water but can be any other fluid which contains ions. In operation, for example to detect water flow speed, a magnetic field may be applied orthogonally to the direction of water flowing in the channel at the point where the capacitive sensor is positioned. The magnetic field will physically separate positive ions, for example $H_3O^+$, and negative ions, for example $OH^-$, in the flowing water due to the Lorenz force. This separation may be detected by the capacitive sensor 10. Since the measured capacitance may be proportional to the flow speed of the water in the tube, the processor 12 may convert the detected capacitance value into a value representative of the flow speed of the water. The processor may compensate the detected value for temperature using the temperature value detected by the temperature sensor 24 which may be a PTat temperature sensor. The power management unit 28 may supply power to the capacitive sensor 20, the temperature sensor 24, the processor 12, the transponder 22 and the display 18 in response to the touch sensor being touched. The capacitive sensor 10 and processor 12 may be periodically powered in a low power or sleep mode. The power management unit 28 may change to a normal power mode in response to a rapid change in detected capacitance corresponding to a large increase in flow rate. This may be caused for example by a tap or faucet being turned on. The flow sensor 500 may display one or more of the fluid flow rate, fluid temperature and volume of fluid flowing past the flow sensor during a certain time period.

The transponder 22 may transmit data on the flow speed, volume of fluid and temperature to a receiver. The transponder 22 may receive control information such as a signal to power down or reset the flow sensor 500. The transponder 22 may receive data indicating a predetermined flow rate and/or volume of fluid to be measured. This may be used for example to remotely control and/or monitor water flow rate or water volume dispensed through a tap or shower. The transponder 22 may transmit data to the internet via a wireless router.

One or more of the power management unit 28, the capacitive sensor 10, the temperature sensor, the processor 12 and the transponder 22 may be integrated on a CMOS integrated circuit. The processor 12 maybe a microprocessor or microcontroller configured to calculate the flow rate from the detected capacitance. Alternatively the processor 12 may be implemented as logic hardware.

Figure 9:
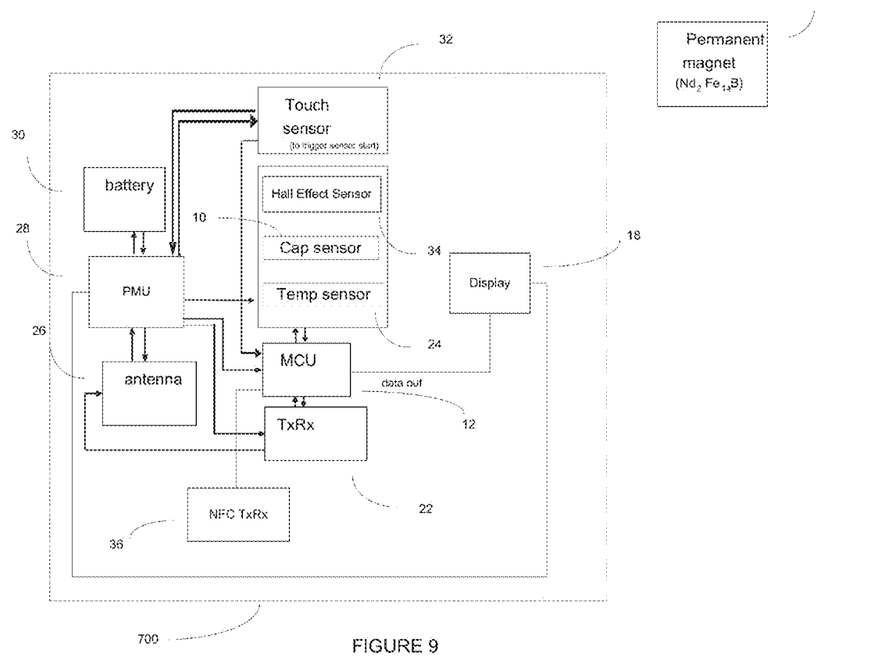
FIG. 9 illustrates a flow sensor including a Hall Effect sensor according to an embodiment.

FIG. 9 shows flow sensor 700 including a capacitive sensor 10 which may be coupled to a processor 12. The capacitive sensor 10 may include multiple small capacitor electrodes which may be nano-electrodes and formed using CMOS technology. Touch sensor 32 may be connected to a power management unit 28. A battery 30 may be connected to the power management unit 28. Power management unit 28 may be connected to a capacitive sensor 10, a temperature sensor 24, a processor 12 and a transponder 22. The transponder 22 may be configured to transmit/or receive signals according to the Zigbee standard. The transponder 22 may be connected to antenna 26. The transponder 22 may be connected to processor 12. Temperature sensor 24 may be connected to processor 12. Magnetic field sensor 34 which may be a Hall-Effect sensor may be connected to processor 12. NFC Transceiver 36 may be connected to processor 12. In operation the NFC transceiver 36 may receive a signal from an NFC transmitter to provide power to the flow sensor 400. The NFC transceiver 36 may receive a signal from an NFC transmitter indicating a predetermined volume of fluid. In embodiments, the NFC transceiver 36 may include a secure element.

The operation of the flow sensor 700 is similar to that of flow sensor 600. In addition the magnetic field may be sensed by magnetic field sensor 34 which may be a Hall Effect sensor. This output of the Hall Effect sensor may be used by the processor 12 to determine the magnetic field strength so providing the predetermined magnetic field strength value for calculating the flow rate. In addition the processor may compensate for the effect of any magnetic field strength variation when determining the fluid flow rate. In operation the NFC transponder 38 may receive a signal from an NFC transmitter to provide power to the flow sensor 700. The NFC transceiver 36 may receive a signal from an NFC transmitter indicating a predetermined volume of fluid. In embodiments, the NFC transceiver 36 may include a secure element. This may be used for example to authenticate whether or not a valve controlling the fluid in a channel may be opened or adjusted.

In embodiments, one or more of the power management unit 28, the capacitive sensor 10, the temperature sensor 24, the magnetic sensor 34, the RF transceiver 22, the processor 12 and the NFC transceiver 36 may be integrated on a CMOS integrated circuit.

Figure 10:
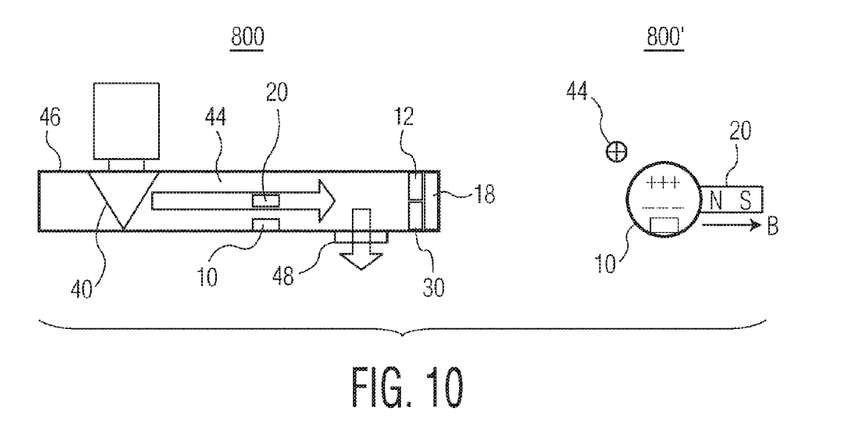
FIG. 10 shows a tap or spigot or faucet including a flow sensor according to an embodiment.

FIG. 10 shows a tap or spigot or faucet in longitudinal cross-section 800 and in transverse cross-section 800'. Tap 700 has a tube 46 for carrying fluid and a valve 40 located within the tube 46 which controls the flow of fluid through the channel formed by the tube and out of the tap through an outlet 48. The direction of fluid flow is shown in 44 which is orthogonal to the direction of the magnetic field direction B. Capacitive sensor 10 is located in the channel and is coupled to processor 12. Processor 12 may be coupled to battery 30. Battery 30 may be connected to display 18 and capacitive sensor 10. The flow of water or other ion containing fluid may be controlled by valve 40. Permanent magnet 20 is positioned such that the magnetic field B is approximately orthogonal to the direction of flow of the fluid. In operation, when the valve 40 is opened allowing water to flow, the capacitive sensor 10 detects changes capacitance due to the displacement of the ions in the water by the magnetic field provided by the permanent magnet 20. This change in capacitance is processed by the processor 12 which converts the capacitance value change into a measure of the flow of fluid. This information is displayed on display 18. The cross-sectional area of the channel in the tap through which the fluid flows is known and therefore the processor 12 may also send data on the total volume of water or other ion containing fluid that has flowed following the opening of the valve 40 to the display 18. Any significant change of the measured capacitance value may indicate that either the flow has started i.e. the valve 40 has been opened. Alternatively any change of the measured capacitance value may indicate that the fluid flow has stopped i.e. the valve has been shut. The magnet 20 may be positioned such that the magnetic field is orthogonal to the sensing plane of the capacitive sensor 10. This results in the maximum displacement of ions either directly towards or directly away from the capacitive sensor 10. This positioning therefore gives maximum sensitivity of detection of the flow rate. However other relative positioning of the magnet and sensor is possible at the expense of reduced sensitivity. The capacitive sensor 10 may be connected by a wire to processor 12 alternatively it may be a wireless connection for example via a NFC link. In the latter case the capacitive sensor 12 may include a NFC receiver to receive power via the NFC link.

Figure 11:
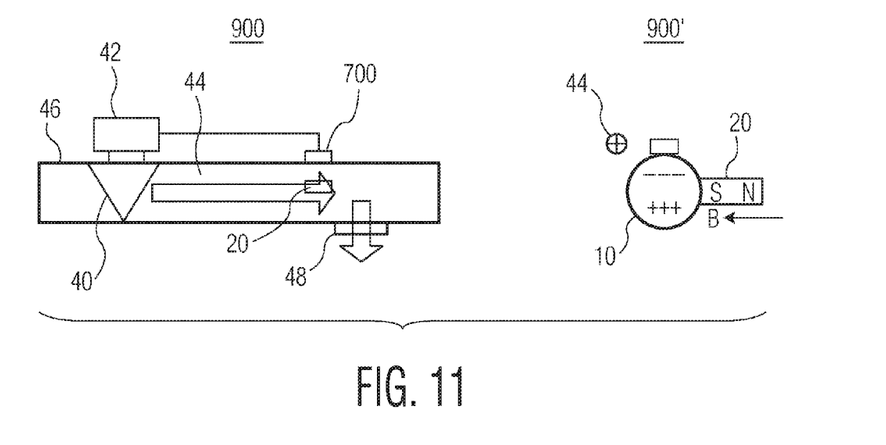
FIG. 11 illustrates a tap or spigot or faucet, including a flow sensor coupled to the valve according to a further embodiment.

FIG. 11 shows a tap or spigot or faucet longitudinal cross-section 900 and in transverse cross-section 900'. Tap 900 includes a flow sensor 700 of the embodiment of FIG. 9. Tap 900 has a tube 46 for carrying fluid and a valve 40 located within the tube 46 which controls the flow of fluid through the channel formed by the tube and out of the tap through an outlet 48. Flow sensor 700 may be connected to an actuator 42. Actuator 42 may be connected to valve 40. Permanent magnet 20 may be positioned on the body of the tap 900 such that the magnetic field may be orthogonal to the direction of flow of the fluid 44. Alternatively the tap may be at least partially formed from a hard magnetic material.

The magnetic field will physically separate positive ions, for example $H_3O^+$, and negative ions, for example $OH^-$, in the flowing water due to the Lorenz force. This separation may be detected as change in capacitance by the flow sensor 700. Since the measured capacitance may be proportional to the flow speed of the water in the tube, the flow sensor 700 may convert the detected capacitance value into a value representative of the flow speed of the water. The flow sensor 700 may compensate the detected value for temperature using the temperature value detected by the temperature sensor 24 and the measured magnetic field detected by the magnetic field sensor 34. The flow sensor 700 may signal the actuator 42 to open the valve 40 in response to the touch sensor being touched.

The transponder 22 in flow sensor 700 may transmit data on the flow speed, volume of fluid and temperature to a receiver. The transponder 22 may receive control information such as a signal to power down or reset the flow sensor 700. The transponder 22 may receive data indicating a predetermined flow rate and/or volume of fluid to be measured. This may be used to remotely control and/or monitor fluid flow rate or fluid volume dispensed through the tap 800. The transponder 22 may transmit data to the Internet via a wireless router.

In operation the NFC transponder 38 may receive a signal from an NFC transmitter to provide power to the flow sensor 700. The NFC transponder 38 may receive a signal from an NFC transmitter indicating a predetermined volume of fluid. The NFC transmitter may be incorporated in a fluid containing vessel, for example a cup. In operation, for example to detect water flow speed, a magnetic field may be applied orthogonally to the direction of water flowing in the channel at the point where the capacitive sensor is positioned. The magnetic field will physically separate positive ions, for example $H_3O^+$, and negative ions, for example $OH^-$, in the flowing water due to the Lorenz force. This separation may be detected by the capacitive sensor 10. Since the measured capacitance may be proportional to the flow speed of the water in the tube, the processor 12 may convert the detected capacitance value into a value representative of the flow speed of the water. The processor may compensate the detected value for temperature using the temperature value detected by the temperature sensor 24 which may be a PTat temperature sensor. The power management unit 28 may supply power to the capacitive sensor 20, the temperature sensor 24, the processor 12, the transponder 22 and the display 18 in response to the touch sensor being touched. In embodiments the capacitive sensor 10 and processor 12 may be periodically powered in a low power or sleep mode. The power management unit 28 may change to a normal power mode in response to a rapid change in detected capacitance corresponding to a large increase in flow rate. This may be caused for example by a tap or faucet being turned on. The flow sensor 700 may display one or more of the fluid flow rate, fluid temperature and volume of fluid flowing past the flow sensor during a certain time period.

The transponder 22 may transmit data on the flow speed, volume of fluid and temperature to a receiver. The transponder 22 may receive control information such as a signal to power down or reset the flow sensor 700. The transponder 22 may receive data indicating a predetermined flow rate and/or volume of fluid to be measured. This may be used for example to remotely control and/or monitor water flow rate or water volume dispensed through a tap or shower. For example a cup containing a NFC transmitter or an RFID tag may include data representing the volume of water that the cup can contain. When the cup is moved near to the tap 900, the volume of water required to fill the cup may be transmitted from the NFC transmitter and received by the NFC transponder in the flow sensor 700. The flow sensor 700 may then signal to the valve actuator 42 to open the valve 40. The flow sensor 700 may sense the volume of water flowing through the tap following the opening of the valve 40. Once the predetermined volume has been reached, the flow sensor 700 may signal to the valve actuator 42 to close the valve 40. The transponder 22 may transmit data to a remote location via a wireless router connected to a computer network. In embodiments, the NFC transponder 38 may include a secure element. This may be used for example to authenticate whether or not a valve controlling the fluid in a channel may be opened or adjusted.

Embodiments of the flow sensors may be included in a tap or water meter. Embodiments of the flow sensor may also be included in control systems for irrigation. Embodiments of the flow sensor may also be used to detect leaks. The flow sensor may also include other types of sensors. For example a pH sensor may be coupled to the processor and the flow sensor may then be used for example to detect changes in the chemical composition of water. The flow sensor may be formed on an integrated circuit together with other analogue and digital circuits.

Embodiments of the flow sensor may be included in a tap or water meter. Embodiments of the flow sensor may be included in a water e-meter. For instance the e-meter may be installed at the main water pipe to a house, or at several pipes inside a house such as the kitchen, bathroom, etc. The e-meters may communicate with a hub via RF, and deliver data of how much water is consumed to the hub. The hub may keep an overview of water consumption in the house.

The flow sensor may also be included in other machines that use water in the process, such as automatic coffee machines, washing machines and dishwashers.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable sub combination.

The applicant hereby gives notice that new claims may be formulated to such features and/or combinations of such features during the prosecution of the present application or of any further application derived therefrom.

For the sake of completeness it is also stated that the term "comprising" does not exclude other elements or steps, the term "a" or "an" does not exclude a plurality, a single processor or other unit may fulfil the functions of several means recited in the claims and reference signs in the claims shall not be construed as limiting the scope of the claims.

The invention claimed is:

1. A flow sensor for detecting the rate of flow of an ion-containing fluid in a channel, the flow sensor comprising:
   a capacitive sensor, wherein the capacitive sensor is placed on only one side of the channel; and
   a processor coupled to the capacitive sensor; wherein
   the capacitive sensor is operable to detect changes in capacitance value due to the deflection of the ions in the fluid by a magnetic field, and
   the processor is operable to determine a flow speed of the fluid from the detected change in capacitance value and a predetermined value of magnetic field strength.

2. The flow sensor of claim 1 wherein the capacitive sensor comprises a plurality of nano-electrodes.

3. The flow sensor of claim 2 wherein the capacitive sensor further comprises a plurality of charge pump circuits and a plurality of integration capacitors and wherein each of the plurality of charge pump circuits is coupled to a respective one of the plurality of nano-electrodes and a respective one of the plurality of integration capacitors.

4. The flow sensor of claim 1 further comprising a temperature sensor coupled to the processor wherein the flow sensor is operable to measure a fluid temperature and the processor is operable to adjust the determination of the flow rate in response to the detected temperature.

5. The flow sensor of claim 1 further comprising a magnetic field sensor coupled to the processor, wherein the flow sensor is further operable to detect a magnetic field strength and the processor is operable to adjust the determination of the flow rate in response to the detected magnetic field strength.

6. The flow sensor of claim 1 wherein the processor is further operable to calculate the volume of fluid flowing in a channel of a predetermined cross-sectional area past the capacitive sensor.

7. The flow sensor of claim 1 further comprising a touch sensor coupled to the processor, wherein the flow sensor is operable to change from a standby mode of operation to a normal mode of operation in response to the touch sensor being touched by a user.

8. The flow sensor of claim 1 further comprising a near field communication receiver coupled to the processor.

9. The flow sensor of claim 1 further comprising a radio frequency transponder coupled to the processor.

10. The flow sensor of claim 1 further comprising a pH sensor coupled to the processor wherein the flow sensor is operable to detect a change of chemical composition of the fluid.

11. The flow sensor of claim 1, comprising a magnet arranged such that in operation the magnetic field displaces one of the positive ions and the negative ions in the fluid towards the capacitive sensor.

12. A tap comprising a flow measurement apparatus comprising:
a flow sensor for detecting the rate of flow of an ion-containing fluid in a channel, the flow sensor comprising:
a capacitive sensor, wherein the capacitive sensor is placed on only one side of the channel; and
a processor coupled to the capacitive sensor; wherein
the capacitive sensor is operable to detect changes in capacitance value due to the deflection of the ions in the fluid by a magnetic field, and
the processor is operable to determine a flow speed of the fluid from the detected change in capacitance value and a predetermined value of magnetic field strength; and
a magnet arranged such that in operation the magnetic field displaces one of the positive ions and the negative ions in the fluid towards the capacitive sensor.

13. The tap of claim 12, wherein
the flow sensor further comprises a near field communication receiver coupled to the processor; and
the near field communication receiver is operable to receive data representing the predetermined volume transmitted from a near field communication transmitter.

14. The tap of claim 12, wherein
the flow sensor further comprises a touch sensor coupled to the processor, wherein the flow sensor is operable to change from a standby mode of operation to a normal mode of operation in response to the touch sensor being touched by a user; and
the flow sensor is coupled to an actuator for controlling a valve and wherein the tap is operable to open and/or close the valve in response to the touch sensor being touched.

15. A method of measuring the flow rate of an ion-containing fluid, the method comprising:
detecting, on only one side of a channel, a change in capacitance value due to the deflection of the ions in the fluid by a magnetic field, and
determining a flow rate from the change in capacitance value.

\* \* \* \* \*